United States Patent [19]
Otto

[11] Patent Number: 5,918,852
[45] Date of Patent: Jul. 6, 1999

[54] WIDE FLOW RANGE PROPORTIONAL FLOW VALVE

[75] Inventor: Noel Otto, Whippany, N.J.

[73] Assignee: Automatic Switch Company

[21] Appl. No.: 08/990,545

[22] Filed: Dec. 15, 1997

Related U.S. Application Data

[63] Continuation of application No. 08/928,974, Sep. 12, 1997, which is a continuation of application No. 08/664,526, Jun. 17, 1996, Pat. No. 5,676,342.

[51] Int. Cl.$^6$ .................................................. F16K 31/04
[52] U.S. Cl. ........................................ 251/30.04; 251/118
[58] Field of Search ........................... 251/30.02, 30.03, 251/30.04, 45, 46, 38, 25, 123, 118

[56] References Cited

U.S. PATENT DOCUMENTS

| | | |
|---|---|---|
| 4,971,287 | 11/1990 | Shaw .................................. 251/45 X |
| 4,981,155 | 1/1991 | Pick et al. ...................... 251/30.03 X |
| 5,169,118 | 12/1992 | Whiteside ........................... 251/30.03 |

*Primary Examiner*—Kevin Lee
*Attorney, Agent, or Firm*—Levine & Mandelbaum

[57] ABSTRACT

A proportional flow valve wherein inlet fluid pressure urges a main valve member toward a valve seat. A cylindrical bearing ring is mounted on the main valve member and slideable within an axial bore leading from the main valve seat to an outlet port for axially stabilizing the main valve member and limiting pressure differential across the main valve member while the bearing ring is at least partially disposed within the axial bore. The outer circumference of the bearing ring may have circumferential grooves for producing eddy currents and turbulence to enhance the limitation of pressure differential across the main valve member.

7 Claims, 3 Drawing Sheets

WIDE FLOW RANGE PROPORTIONAL FLOW VALVE

This patent application is a continuation of Ser. No. 08/928,974 filed Sep. 12, 1997, which is a continuation of application Ser. No. 08/664,526 filed Jun. 17, 1996, now U.S. Pat. No. 5,676,342 issued Oct. 14, 1997.

BACKGROUND OF THE INVENTION

This invention relates to a valve operated by an electrical solenoid actuator, and more particularly to a proportional flow valve of this type.

Proportional flow valves find utility in performing mixing and measurement functions. For example, proportional flow valves are used to accurately blend different gasolines to achieve desired characteristics, such as particular octane ratings, and to mix hot and cold water to obtain a desired temperature. Also, a proportional valve may be used when it is desired to have a valve open gradually so that the flow of the controlled fluid begins slowly, after which the valve may be fully opened.

Typically, the power applied to the solenoid actuator is a periodically pulsed DC current, the amount of current varying with the length of "on" and "off" times of the pulses (sometimes referred to as pulse width modulation).

Prior art valves of the type described above which are of sufficient size to permit high rates of fluid flow are susceptible to wide variations in the force necessary to raise the valve member from the main valve seat from a fully closed position to an open one which make it difficult to precisely regulate low flow rates. Hence prior art valves suitable for controlling high flow rates are inherently unable to regulate fluid flow at low flow rates.

When a closed valve is being opened, as soon as the main seal of a prior art valve is lifted off of the main valve seat, there is a rush of fluid across the main valve seat which results in a rapid drop in pressure at the inlet port and, hence, above the main valve member which causes the main valve member to "jump" away from the main valve seat. Conversely, when an open valve is being closed, as the main valve seal nears the main valve seat, there is a sudden increase in pressure at the inlet port and, hence, above the main valve member which causes the main valve member to clamp down upon the main valve seat. The foregoing tendencies make it very difficult to precisely move the main valve member relative to the main valve seat to achieve constant low flow rates with the main valve seal spaced very closely to the main valve seat.

In addition to the foregoing problems of prior art valves, they are also subject to a tendency of the valve member to skew or tilt from the axis of the bore in the valve seat just before and after the valve is opened and closed. Random tilting of the main valve member affects the cross sectional area of flow from the inlet port through the opening in the main valve seat and, hence, the rate of flow. Consistency of flow rate at a predetermined level of solenoid engergizing current suffers when the main valve member is subject to skewing.

SUMMARY OF THE INVENTION

The aforementioned problems of the prior art are overcome in a valve having a wide range of controllable flow rates in accordance with the invention. The valve of the present invention employs a main valve unit which includes a flexible diaphragm connected to the valve body and to a movable main valve unit. A bleed passageway between the regions above and below the diaphragm permits fluid entering the inlet port to occupy both regions. When the region above the diaphragm is pressurized by fluid from the inlet port of the valve it opposes the force of the inlet fluid pressure in the region below the diaphragm. The area of the main valve unit exposed to the region above the diaphragm has a larger effective area than the area of the main valve unit exposed to the region below the diaphragm, so that when the main valve unit is subjected to inlet fluid pressure, the main valve unit is urged toward the main valve seat to keep the valve closed. When the region above the main valve unit is open to the outlet port, the fluid in that region is permitted to escape faster than the bleed passageway can supply fluid, and the resulting pressure decrease in the region above the main valve unit causes a net force urging the main valve unit to move away from the main valve seat to open the valve, and keep it open.

A pilot valve includes a pilot valve sealing member carried by the solenoid armature and a pilot valve seat fixed to and moveable with the main valve unit. The pilot valve controls the flow of inlet fluid pressure in the region above the main valve unit to the outlet port. As a result, the position of the armature indirectly controls the position of the main valve unit by controlling the flow of inlet fluid pressure to the outlet port. The bleed passageway continuously bleeds pressurized fluid from the inlet port to the reservoir above the main valve unit so as to keep the main valve unit sensitive to the control of inlet fluid pressure by the pilot valve.

Mounted about the outer circumference of the main valve member, just below the main valve seal, is a cylindrical bearing ring having an outer circumference which is almost equal to the inner circumference of the cylindrical bore leading from a circular opening in the main valve seat. As the main valve seal approaches the main valve seat for closing the valve, the bearing ring enters the bore thereby preventing the main valve member from significantly tilting out of the plane of the main valve seat.

In addition to preventing tilting of the main valve member relative to the axis of the main valve seat, the small clearance between the outer circumference of the bearing ring and the inner circumference of the bore in the main valve seat also limits the flow through the valve as the main valve seal is initially lifted from the main valve seat, i.e., while the bearing ring is still at least partially within the bore in the main valve seat.

Ridges may be provided on the outer cylindrical surface of the main valve ring to cause eddy currents and turbulence which further decrease the initial rate of flow as the main valve seal is lifted from the main valve seat while the main valve ring is still at least partially disposed within the bore of the main valve seat.

By reducing the opening and closing force for the valve and preventing skewing of the valve member, the invention permits low flow rates to be maintained and controlled by a valve which is constructed to permit much higher flow rates.

It is therefore an object of the invention to provide a valve in which the rate of change of the force required to raise and lower the main valve member relative to the main valve seat during opening and closing of the valve is substantially less than in prior art valves thereby enabling precise control and maintenance of low flow rates in a valve large enough to permit substantially higher flow rates.

Another object of the invention is to provide a valve of the type described above in which significant tilting of the main valve member out of the plane of the main valve seat during opening and closing of the valve is prevented for enhancing repeatability of flow rate with respect to solenoid current.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
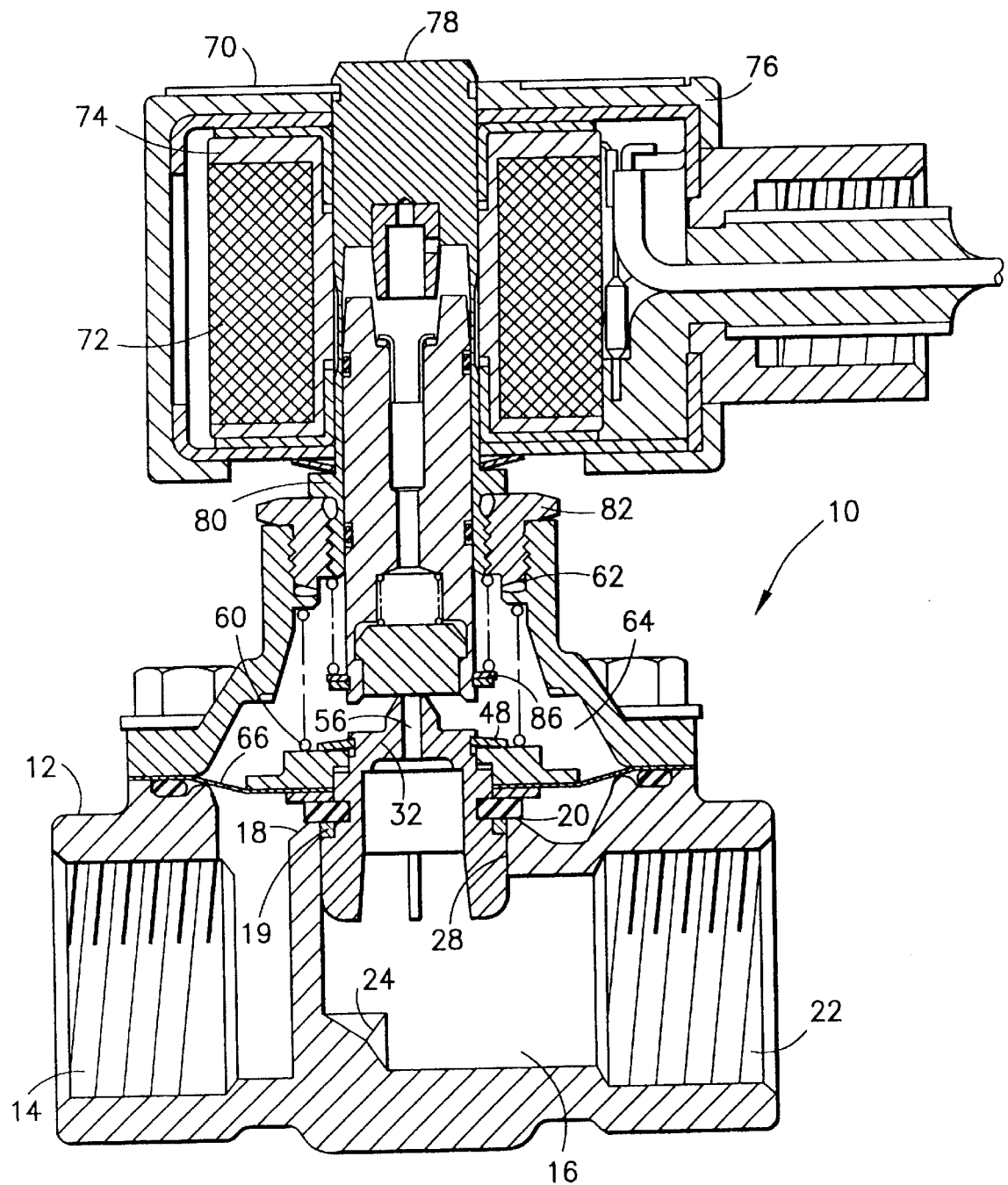
FIG. 1 is a cross sectional view of a proportional flow valve in accordance with the embodiment of the invention, the solenoid actuator being deenergized and the valve closed.
Figure 1A:
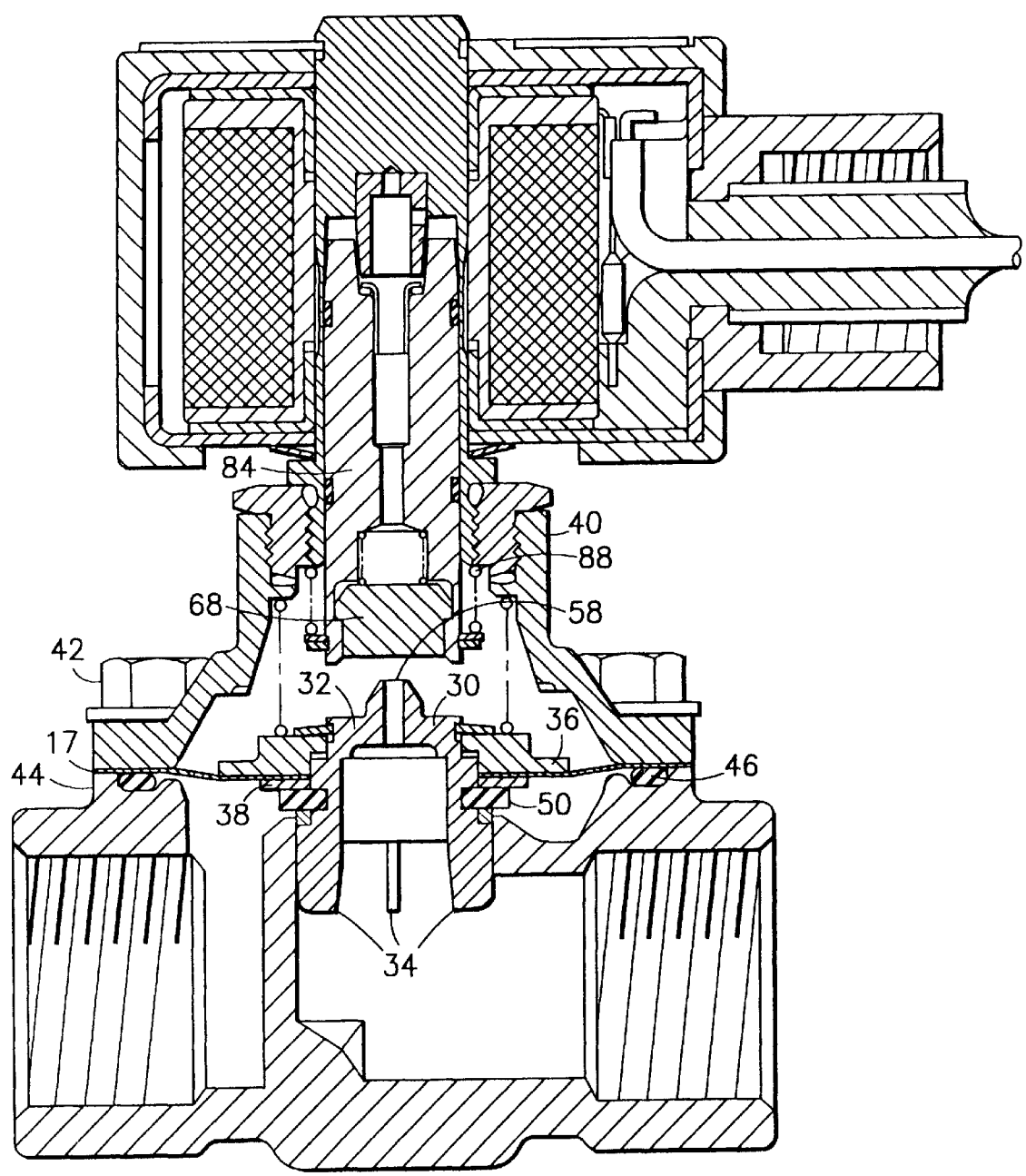
FIG. 1A is a view similar to FIG. 1, showing the solenoid energized and pilot valve open, the main valve partially open.

Referring to FIGS. 1 and 1A of the drawings, a proportional flow valve 10 chosen to illustrate the present invention includes a valve body 12 having a fluid inlet port 14, a fluid outlet port 16, and main valve seat 18 surrounding a main orifice or opening 20. The outlet port 16 resides within a hollow elbow having a right angular bend 24, which joins a horizontal section 22, and a vertical section 28 having an axial vertical bore extending from the opening 20 in the main valve seat 18.

Figure 3:
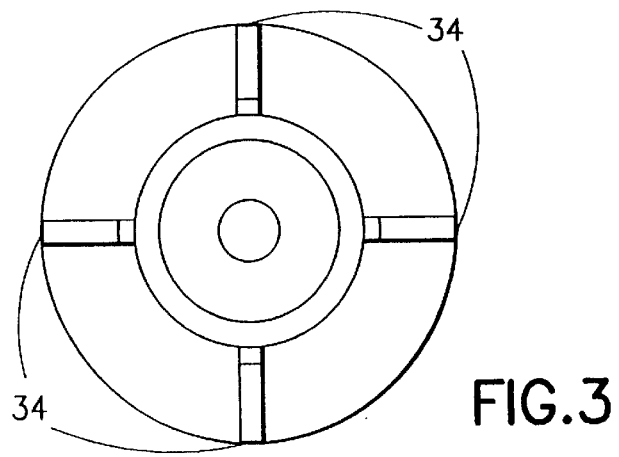
FIG. 3 is a plan view of the element of FIG. 2.

A main valve unit 30 includes a main valve member 32 slidably mounted within vertical section 28 of outlet port 16 for reciprocal axial movement. The main valve member 32 has a generally circular cross section and four axially extending circumferentially equally spaced parallel vanes 34 as can be seen in FIG. 3. The outer circumference of the main valve member 32 is profiled to accept an upper diaphragm support washer 36 having a planar lower annular surface and a diaphragm retaining ring 38 having a planar upper annular surface. Sandwiched between the lower annular surface of upper diaphragm support washer 36 and upper annular surface of diaphragm retaining ring 38 for movement with the main valve member 32 is the central area of an annular flexible diaphragm 17 which serves as a pressure member for the valve 10.

A bonnet plate 40 is secured to the top of the valve body 12 by suitable fasteners 42. Disposed between the bonnet plate 40 and a raised circumferential ridge 44 on the top of the valve body 12 is the outer circumference of diaphragm 17 which is fixedly held on its top side by the bonnet plate 40, and on its bottom side by the raised circumferential ridge 44 of the valve body 12 and a seal 46 inside and concentric with the ridge 44. Seal 46 cushions the underside of the diaphragm 17 and prevents leakage of fluid at the interfaces between the bonnet plate 40, valve body 12, and diaphragm 17.

An annular retaining clip 48 captured in a groove circumscribing the main valve member 32 urges the upper diaphragm support washer 36 toward the central region of diaphragm 17 to secure diaphragm 17 against diaphragm retaining ring 38. The vanes 34 are notched to received an annular main valve seal 50 below retaining ring 38. Main valve seal 50 is preferably fabricated from an elastomeric material.

The main valve unit 30 includes main valve member 32, upper diaphragm support washer 36, diaphragm retaining ring 38, diaphragm 17, retaining clip 48, and main valve seal 50, all of which move toward and away from the main valve seat 18 as a unit. During such movement, an intermediate annular portion 54 of diaphragm 17 is free to flex and stretch while the periphery of diaphragm 17 is held fixedly in place. Axial movement of the main valve unit 30 takes place with the vanes 34 of main valve member 32 guided within a vertical cylindrical wall of the outlet port 16 leading from the main valve seat 18.

Within the main valve member 32, running along its central axis, is a pilot passageway in the form of a circular bore 56 surrounded at its upper end by a pilot valve seat 58 and opening at its lower end into the outlet port 16. The pilot passageway 56 is selectively opened and closed by a pilot valve sealing member 68.

A main valve spring 60 is compressed between a shoulder 62 formed with the bonnet plate 40 and the top surface of the upper diaphragm support washer 36 thereby urging the main valve unit 30 downwardly into engagement with the main valve seat 18.

The fluid inlet port 14 is bounded by the underside of the main valve unit 30 (including diaphragm 17) and the exterior surface of vertical section 28 of outlet port 16. A reservoir 64 occupies the open volume above the main valve unit 30.

The diaphragm 17 is impermeable to the fluid to be controlled by the proportional flow valve 10 except at a small aperture 66 in diaphragm 17 which serves as the bleed passageway for enabling fluid entering the inlet port 14 to reach the reservoir 64 above the main valve unit 30. The bleed passageway 66 has a smaller cross section than the smallest cross section of pilot passageway 56 so that fluid can flow through the pilot passageway 56 faster than through the bleed passageway 66 when the pilot passageway 56 is open.

When the pilot valve is closed, i.e., when pilot valve sealing member 68 engages pilot valve seat 58, and the main valve is closed, i.e., when main valve seal 50 engages main valve seat 18, fluid cannot flow from the fluid inlet port 14 to the fluid outlet port 16. When the pilot valve is open, i.e., when pilot valve sealing member 68 is not in engagement with pilot valve seat 58, and the main valve is closed, fluid can flow from the fluid inlet port 14 to the fluid outlet port 16 only through the bleed hole passageway 66 into the reservoir 64, and then from reservoir 64 through pilot passageway 56. When main valve seal 50 is out of engagement with main valve seat 18, fluid flow can occur through the space between the vanes 34 of main valve member 32. The exposed area of the openings between the vanes 34 increases as the main valve unit 30 rises thereby correspondingly increasing the rate of flow from the fluid inlet port 14 to the fluid outlet port 16.

Surmounting the bonnet plate 40 is a solenoid actuator 70. The solenoid actuator 70 includes a coil 72 of electrically conductive wire would around a spool 74 made of non-electrically and non-magnetically conductive material. Suitable terminals are provided for connection to a source of electric current for energizing the solenoid coil 72. A housing 76 of magnetic material, surrounds the solenoid coil 72.

A stationary armature or plugnut 78 is located within the upper portion of the spool 74. A core tube 80 extends downwardly from the plugnut 78 and through the remainder of the spool 74. Surrounding the lower portion of the core tube 80 is a collar 82 which is, in turn, fastened to the upper portion of the bonnet plate 40. Fastening between the core tube 80 and collar 82, and between the collar 82 and bonnet plate 40 can be by press fit, welding, crimping, threading or in any other conventional manner of forming a sturdy and fluid tight connection as will be known to those skilled in the art.

Slidably axially disposed within the core tube 80 is a movable armature 84 of magnetic material. Mounted on the movable armature 84 near its lower end is a circumferential flange 86. A pilot valve spring 88 surrounding the movable armature 84 is compressed between circumferential flange 86 and the bottom surface of collar 82 and urges the movable armature 84 downwardly away from plugnut 78. The upper face of the movable armature 84 and lower face of the plugnut 78 are correspondingly profiled so that the two faces mesh as the movable armature 84 moves toward the plugnut 78. At its lower end, the movable armature 84 carries the pilot valve sealing member 68 formed of resilient material.

When solenoid coil 72 is deenergized (FIG. 1) and the fluid inlet port 14 of proportional flow valve 10 is connected to a source of pressurized fluid, e.g. a gasoline pump, the fluid is forced through the bleed hole 66 in the diaphragm 17 into the reservoir 64 above the main valve unit 30. The area of the top of the main valve unit 30 exposed to the fluid is greater than the area of the bottom of the main valve unit 30 exposed to the fluid. Hence, the force of the fluid on the top of main valve unit 30, combined with the force of the spring 60, holds main valve seal 50 against main valve seat 18 to close the proportional flow valve 10. When solenoid coil 72 is first energized by an electric current (FIG. 1A), movable armature 84 is attracted to plugnut 78, and hence begins to move upwardly against the force of spring 88. As movable armature 84 rises, it moves pilot valve sealing member 68 away from pilot valve seat 58, thereby permitting inlet fluid to flow through passageway 56 into outlet port 16 which is at the lower outlet pressure. Because the flow rate through the pilot passageway 56 is greater than the flow rate through the bleed hole 66 in the diaphragm 17, the pressure above the main valve unit 30 and diaphragm 17 begins to decrease. As the upward force of the fluid inlet pressure on the main valve unit 30 begins to exceed the downward force of the fluid pressure on the main valve unit 30, the main valve unit 30 begins to rise and main valve unit 30 moves away from main valve seat 18. Main valve seal 50 disengages main valve seat 18 and communication between fluid inlet port 14 and fluid outlet port 16 through the spaces between vanes 34 of main valve member 32 is enabled, thereby permitting fluid flow from inlet port 14 to outlet port 16.

The main valve unit 30 continues to rise with the pilot valve seat 58 approaching pilot valve sealing member 68 whereat the pilot flow rate begins to decrease. As soon as the flow rate through the pilot passageway 56 is less than the flow rate through the bleed passageway 66, fluid entering the reservoir 64 begins to build, and the downward force on the main valve unit 30 increases until it exceeds the upward force of the inlet fluid against the bottom of main valve unit 30. The result is downward movement of the main valve unit 30. However, as soon as the main valve unit 30 begins to move downwardly, the flow rate through the pilot valve 68 increases, once again permitting high pressure fluid above the main valve unit 30 to escape through passageway 56 to the fluid outlet port 16. An equilibrium position is quickly established at which the flow rates through the pilot passageway 56 and bleed passageway 66 are equal and at which main valve unit 30 is throttled up and down with a very short excursion just below the pilot valve sealing member 68.

The location of the main valve unit 30 as it oscillates is determined by the position of movable armature 84 and, hence, pilot valve sealing member 68. This position also determines the spacing between main valve member 32 and main valve seat 18, and hence determines the rate of flow through the valve.

Referring, again, to FIGS. 1 and 1A of the drawings, each of the vanes 34 is further notched to form a step 101 upon which there is mounted a cylindrical bearing ring 19 having an outer diameter slightly less than the inner diameter of the main valve orifice 20 and the depending bore in the vertical section 28 of the valve housing.

The cylindrical bearing ring 19 serves two principal functions. First, the bearing ring 19 is a stabilizer for the main valve member 32 in that it helps prevent axial skewing of the main valve member 32, that is, the close fit between the cylindrical wall of the bore leading from the main valve orifice 20 and the outer cylindrical wall of the main valve bearing ring 19 prevent the main valve member 32 from tilting as it moves into and out of engagement with the main valve seat 18. Secondly, the bearing ring 19 reduces the sensitivity of the main valve member 32 to the difference in pressure between the inlet and outlet ports during opening and closing of the valve for enhancing control of the main valve member's displacement from the main valve seat 18 to achieve low flow rates.

As the main valve member 32 begins to lift during opening of the valve, as shown in FIG. 1A, the main valve seal 50 separates from the main valve seat 18 to permit fluid flow across the main valve seat 18, i.e. through the opening 20, from the inlet port 14 to the outlet port 16. Because the close fitting bearing ring 19 remains, at least partially, within the main valve seat opening 20 (see FIG. 1A), only minimal flow across the valve seat 18 is permitted during initial lift off of the main valve seal 50 from the main valve seat 18. Only after the bearing ring 19 entirely clears the main valve seat 18 and the space between the vanes 34 is exposed to the inlet port 14 is there a significant increase in the rate of fluid flow across the main valve seat 18.

During the time of minimal flow, that is, while the bearing ring 19 is still partially within the opening 20 in the main valve seat 18, the difference between the pressure in the inlet port 14 and the pressure in the reservoir 64 is substantially less than the pressure difference would be without the bearing ring 19 in the main valve seat opening 20. Accordingly, the upward force exerted on the diaphragm 17 and, hence, on the main valve member 32 is only slightly greater than the downward force exerted by the main valve spring 60 on the main valve member 32.

If the solenoid armature 84 is positioned so that engagement between the pilot valve sealing member 68 and pilot valve seat 58 is reached while the main valve seal 50 is displaced from the main valve seat 18 but the bearing ring 19 is still within the main valve opening 20, the force of the main valve member 32 against the armature 84 is small and upward movement of the main valve member 32 ceases virtually instantly.

Once the pilot valve seat 58 has been sealed by the pilot valve sealing member 68 mounted on the armature 84, pressure builds within the reservoir 64 until the force exerted on the diaphragm from within the reservoir 64 exceeds the upward force exerted by the pressure within the outlet port so that the main valve member 32 is urged downwardly.

Because the net force on the diaphragm 17 while the main valve seal 50 is displaced from the main valve seat 18 is proportional to the area of flow across the main valve seat 18, the forces to which the main valve member 32 is subject are relatively small while the bearing ring 19 is within the main valve seat opening 20 in comparison with the forces to which the main valve member 32 is subject while the bearing ring 19 is outside of the main valve seat opening 20. Accordingly the displacement of the main valve member 32 can be controlled precisely, and the degree of displacement of the main valve seal 50 from the main valve seat 18 can be limited to provide for very low flow rates from the inlet port to the outlet port.

The range of distance over which the main valve seal 50 can be displaced from the main valve seat 18 while allowing for precise control of the main valve member 32 can be increased by increasing the height of the bearing ring 19 in the axial direction.

Figure 2:
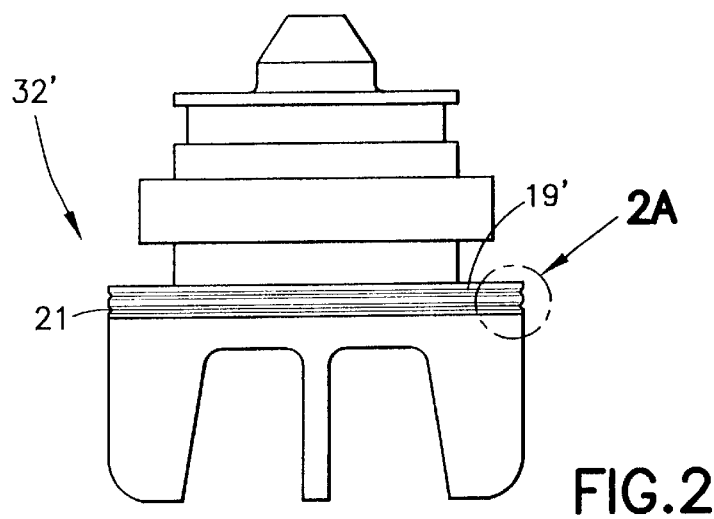
FIG. 2 is a side elevation view of an element suitable for use in a proportional flow valve in accordance with an alternate preferred embodiment of the invention.
Figure 2A:
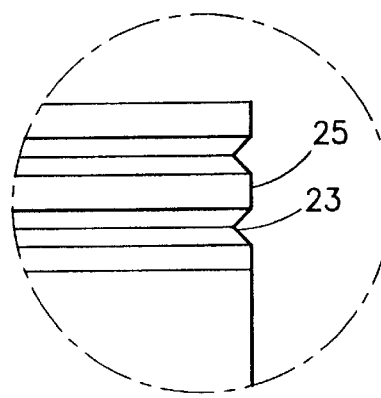
FIG. 2A is an enlarged side elevation view of a portion of the element of FIG. 2.

Referring now to FIGS. 2 and 2A of the drawings, there is shown a main valve unit for use in an alternate embodiment of the invention. Formed in an outer cylindrical wall of, and integral with, the main valve member 32' of FIGS. 2 and 2A is a bearing ring 19' having circumferential grooves 21 which are closely spaced. As fluid flows around the bearing ring 19' when the bearing ring 19' is at least partially within the main valve opening 20, a form of turbulence characterized by eddy currents occurs which provide a resistance to fluid flow from the inlet port 14 to the outlet port 16 across the main valve seat 18, thereby further reducing the rate of change of force on the diaphragm 17 as the main valve seal 50 is raised off of the main valve seat 18. This reduction in rate of change of force further enhances the ability to control the displacement of the main valve member 32 from the main valve seat 18 as the valve is cracked open to permit very low flow rates. That is, the resistance to flow about the bearing ring 19' makes the displacement of the main valve member 32 less sensitive to the pressure differential between the inlet and outlet ports than is the case in prior art valves which do not have a cylindrical bearing ring 19 or 19' moveable with a main valve member 32 or 32' within the bore leading from the main valve seat 18 after disengagement of the main valve seal 50 from the main valve seat 18.

The bearing ring 19 or 19' may be separate from and mounted on the main valve member 32 as shown in FIG. 1 and grooves 21, or it may be integral with the main valve member 32 as is shown in FIGS. 2 and 2A. Where eddy current-causing grooves 21 are to be employed, they may be machined or molded directly into the main valve member 32.

In the preferred embodiments of the invention, the bearing ring 19 or 19' has an aspect ratio of axial height to diameter in the range of 0.04 to 0.16. In an example of the preferred embodiment of the invention, the ring has an axial height of 0.06 inches and a diameter of 0.742 inches, and, an aspect ratio of axial height to diameter of approximately 0.08. Where grooves 21 are employed to produce eddy currents, the axial distance between adjacent grooves is preferably between 0.01 and 0.03 inches. In the preferred embodiment of the invention, the axial distance between adjacent grooves is approximately 0.02 inches. The radial distance between the bottoms 23 of the grooves 21 and adjacent lands 25 is in the range of 0.5 to 2.0 percent of the maximum diameter of the main valve member 32.

It is to be appreciated that the foregoing is a description of a preferred embodiment of the invention to which variations and modifications may be made without departing from the spirit and scope of the invention. For example, the grooves 19' in the main valve unit 32' need not necessarily be equally spaced, parallel or of uniform height and depth. Other irregularities may be introduced to cause eddy currents and/or turbulence.

What is claimed is:

1. A proportional flow valve comprising:

a valve body including an inlet port, an outlet port, a fluid reservoir between said inlet port and said outlet port, and a main valve seat mounted in said body and having an inlet side exposed to said inlet port and an outlet side exposed to said outlet port, said body further having an axial bore of uniform cross section leading from said main valve seat to said outlet port, a main valve member slideably mounted within said main valve body and having a pilot opening and a pilot seat surrounding said pilot opening, sealing means moveable into and out of engagement with the main valve seat to close and open the valve, and bearing means slideable within said axial bore during at least partial travel of said main valve member from a closed position at which said sealing means engages said main valve seat to an open position at which said sealing means is displaced from said main valve seat, and a solenoid mounted on said valve body for fixing the position of said main valve member, said solenoid having a plunger including a pilot member, said main valve member being maintainable at a first open position in response to movement of said plunger to a first position whereat said main valve seat is adjacent said main valve member and said bearing means is at least partially disposed within said bore for minimizing the rate of change of the pressure differential across the main valve member in order to enable precise control and maintenance of low flow rates, and said main valve member being maintainable at a second open position in response to movement of said plunger to a second position whereat said main valve seat is distal from said main valve member and said bearing means is outside of said bore for maintenance of flow rates greater than said low flow rates.

2. A valve according to claim 1 wherein the bearing means comprises a cylindrical bearing ring and the axial bore is cylindrical.

3. A valve according to claim 2 wherein the bearing ring has an aspect ratio of an axial height to outer diameter in the range of 0.04 to 0.16.

4. A proportional flow valve comprising:

a valve body including an inlet port, an outlet port, a fluid reservoir between said inlet port and said outlet port, and a main valve seat mounted in said body and having an inlet side exposed to said inlet port and an outlet side exposed to said outlet port, said body further having an axial bore of uniform cross section leading from said main valve seat to said outlet port, a main valve member slideably mounted within said main valve body, said main valve member comprising sealing means moveable into and out of engagement with the main valve seat to close and open the valve, and bearing means slideable within said axial bore during travel of said main valve member from a closed position at which said sealing means engages said main valve seat to an open position at which said sealing means is displaced from said main valve seat, wherein the bearing means has an irregular outer surface for causing eddy currents to resist fluid flow from the inlet port to the outlet port across the main valve seat for lessening the change in pressure differential across the main valve member while the main valve member is moved and the bearing means is at least partially within the axial bore.

5. A valve according to claim 4 wherein the bearing means has a plurality of alternating lands and grooves, a radial distance between a bottom of one of the grooves and an adjacent land being in the range of 0.5 to 2.0 percent of the maximum diameter of the main valve member.

6. A valve according to claim 1 wherein said bearing means comprises a ring mounted on said main valve member.

7. A proportional flow valve comprising:

a valve body including an inlet port, an outlet port, a fluid reservoir between said inlet port and said outlet port, and a main valve seat mounted in said body and having an inlet side exposed to said inlet port and an outlet side exposed to said outlet port, said body further having an axial bore of uniform cross section leading from said main valve seat to said outlet port, a main valve member slideably mounted within said main valve body, said main valve member comprising sealing means moveable into and out of engagement with the main valve seat to close and open the valve, and bearing means slideable within said axial bore during travel of said main valve member from a closed position at which said sealing means engages said main valve seat to an open position at which said sealing means is displaced from said main valve seat, wherein said bearing means comprises a plurality of grooves formed within a circumference of said main valve member.

* * * * *